United States Patent [19] [11] 4,095,484
Gautraud [45] Jun. 20, 1978

[54] BALANCING SYSTEM FOR ROTARY ELEMENT

[75] Inventor: John A. Gautraud, Lexington, Mass.

[73] Assignee: Northrop Corporation, Norwood, Mass.

[21] Appl. No.: 764,395

[22] Filed: Jan. 31, 1977

[51] Int. Cl.² ............ G01C 19/02; G01M 1/16; F16F 15/22
[52] U.S. Cl. .................. 74/573 R; 74/5 R; 74/5.5; 73/468; 164/95; 301/5 B
[58] Field of Search ............ 73/460, 468; 74/573, 74/573 F, 574, 5 R, 5.5; 301/5 B, 5 BA; 164/93, 95, 96, 99

[56] References Cited

U.S. PATENT DOCUMENTS

| 829,251 | 8/1906 | Booraem | 74/573 |
|---|---|---|---|
| 998,734 | 7/1911 | Alexanderson | 74/572 |
| 1,983,839 | 12/1934 | Dake | 164/99 |
| 2,285,405 | 6/1942 | Best | 74/573 |
| 2,859,626 | 11/1958 | Maze | 74/573 X |
| 3,365,351 | 1/1968 | Maaz et al. | 74/572 X |
| 3,463,551 | 8/1969 | Clay | 74/573 X |
| 3,521,464 | 7/1970 | Kidby | 64/27 NM X |
| 3,659,434 | 5/1972 | Wolfe | 74/573 X |
| 4,060,009 | 11/1977 | Wyman | 74/573 R |

FOREIGN PATENT DOCUMENTS 2,155,490 8/1972 Germany .................. 164/99

Primary Examiner—Samuel Scott
Assistant Examiner—Don E. Ferrell
Attorney, Agent, or Firm—Kenway & Jenney

[57] ABSTRACT

A system for balancing a rotary element involving two or more materials of different melting temperatures normally fixed in position relative to the rotary element. Heating of the materials first to a point above the highest melting temperature followed by cooling at optimum balance then reheating to a point above the next highest melting point followed by cooling at optimum balance and repeating the procedure for each material results in vernier balancing action, the masses of the various materials being selected to predetermine their effect on balance.

10 Claims, 2 Drawing Figures

BALANCING SYSTEM FOR ROTARY ELEMENT

This invention relates in general to the balancing of rotatable elements in control apparatus and in particular to a balancing system which combines rough and fine adjustments. Although it is not so limited, the invention has particular application in the field of precision instrumentation where the balancing of a rotatable element or elements must approach perfection.

FIELD OF THE INVENTION

The problem of balancing rotatable elements in as old as the wheel. However, in the field of instrumentation and particularly in precision instruments, rotatable elements must be balanced to a degree previously considered unattainable. Typical of such instruments is a gyroscope which, when used in such applications as missile guidance, can fulfill its function only with a gimbal having nearly complete compensation for mass unbalance.

Early, and rather crude, balancing systems utilized such members as screws threaded into the gimbal at off-axis positions. Turning these screws in or out of their threaded openings served to shift the center of gravity of the gimbal. Similar systems involved the bending of tabs attached to the gimbal, again to adjust the center of gravity of the gimbal.

With the advent of floated gyroscopes and similar sealed instruments having rotatable elements, it became desirable to provide balancing mechanisms which would be adjusted without disturbing the integrity of the sealed enclosure. Early solutions to the problem of balance adjustment within the sealed containers generally involved some thermally responsive material which could be heated and rendered molten to permit movement of the material itself or some balancing member on the gimbal which could be frozen in a new position when heat was removed.

In most such systems, an electric heater energizable from the exterior of the sealed container served to heat and convert the thermally responsive material to a plastic state. By orienting the instrument in one or more different positions, the plastic material alone or a balance member trapped by the material could be caused to flow in the direction improving balance of the gimbal and removal of the heat by de-energization of the heater would then permit the thermally responsive material to cool and solidify in the desired position of balance. As might be inferred, however, such a method and system of balancing did not always give an optimum result on the first attempt. Frequently, it became necessary to remelt the material and try again to achieve a better balance. The present invention has as its major object the avoidance of such expensive and timeconsuming cut-and-try methods of achieving balance of rotatable elements.

SUMMARY OF THE INVENTION

At the heart of the present invention is a concept of a vernier adjustment of a thermally responsive balancing system. The concept is embodied in the incorporation of two or more thermally responsive materials of different melting temperatures in a balancing mechanism for a rotating element. By way of further refinement, the mass of each quantity of thermally responsive material and the particular melting temperature may be chosen much in the manner in which the gradations of a scale and vernier slide are established.

In terms of specific apparatus, the invention contemplates the attachment to a rotatable element of a balancing container or pan in which a plurality of thermally responsive materials of differing melting points and, generally, differing masses are carried. A relatively gross balancing can be achieved at a given temperature by melting a first thermally responsive material and causing it to flow in a direction improving balance. At an optimum point the first material is permitted to harden. Next, the procedure can be repeated at a lower temperature by melting a second thermally responsive material and causing it, in turn, to flow in a direction further improving balance. The second material is then also permitted to harden. Two stages of thermally responsive materials will be sufficient to achieve the desired balance in most cases but, in accordance with the present invention, additional materials could be sequentially melted and solidified to further improve balance. The thermally responsive materials which are used, in addition to having differing melting points, are usually employed in differing quantities, each different mass thus affecting the center of gravity of the rotatable element to a predetermined degree. Generally, in a two-stage system the mass of the alloy of higher melting point is selected to be much greater than that of the lower melting point.

BRIEF DESCRIPTION OF THE DRAWING

Although the invention obviously has applications beyond such specific devices, the drawing illustrates a gyroscope in which.

DESCRIPTION OF THE PREFERRED EMBODIMENT

Figure 1:
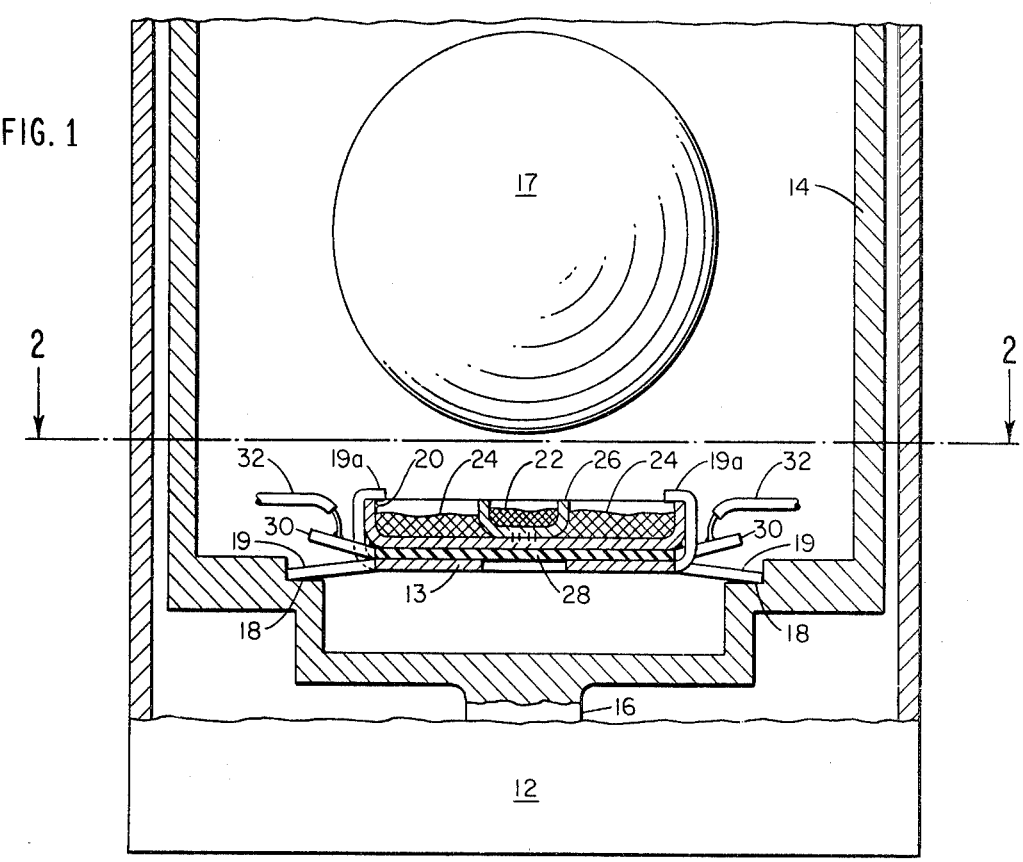
FIG. 1 is a front elevation partly cut off and partly in section of a two-stage balancing system.

In FIG. 1 of the drawing, there may be seen a gyroscope which includes an outer housing 12. The housing may be cylindrical as shown or of spherical or other configuration suitable for the environment in which the instrument is to be used. The housing 12 may be evacuated or fluid-filled and may, in fact, contain a liquid, generally of relatively high density in which a gimbal 14 is floated. Although the gimbal is ideally completely floated in the supporting fluid, it is customary to provide additional mechanical stability by mounting the gimbal in small bearings, not shown, in which the gimbal pivots relative to its housing. One gimbal extension 16 is shown and conventionally it would be matched by a similar extension at the opposite end of the gimbal to permit the gimbal to rotate within the housing 12. Within an axially perpendicular to the gimbal itself there may be mounted a gyroscope spin motor 17, the mounting and electrical connections for which may follow conventional practice in the art.

Figure 2:
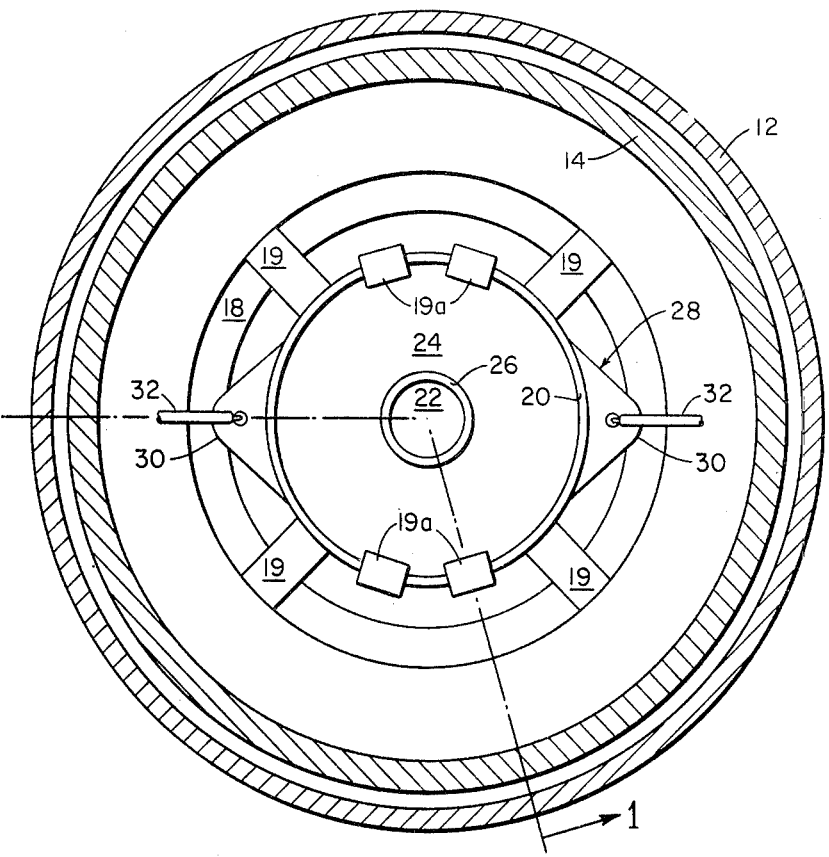
FIG. 2 is a cross-section taken along the lines 2—2 of FIG. 1.

Adjacent one end of the inner cylindrical wall of the gimbal, a shoulder 18 is formed. A spider or support member 13 (see FIG. 2) of generally circular configuration is formed with a series of spaced extensions or tabs 19 and 19a. The tabs 19 are cemented or otherwise firmly fastened to the shoulder 18. Mounted upon the spider 13 is a heater 28 of flat generally circular design having ears 30 to which lead wires 32 are attached. The heater may be of the so-called printed circuit variety or may simply be a resistive coil preferably embedded in a ceramic body. In any case, a layer of insulation is desirably utilized below the heater. For example, a titanium wafer might be interposed between the heater and the spider 13, or the spider itself might be of titanium. Atop the spider 13, a balance pan 20 is firmly held by the tabs 19a which are bent inwardly to clamp the top edge of the pan. The pan 20 is divided into two sections, one a generally cylindrical central volume and the other a generally annular volume, by a ring 26 which may be integral with the balance pan 20.

The surfaces of the container volumes of the balance pan 20 are treated with a suitable material to insure adherence of thermally responsive material to those surfaces. For example, if thermally responsive materials such as eutectic alloys of lead-tin are to be carried in the balance pan, the surfaces may be "tinned" or "flashed" with a metal such as copper or nickel to which the eutectic alloys are strongly adherent.

As is apparent from the illustrated balance pan, the annular volume is considerably larger than the central cylindrical volume, and a mass of alloy 24 carried therein is correspondingly greater than that of the alloy 22 in the cylindrical volume. In a preferred arrangement, the volume of alloy 24 is of mass about 50 times that of alloy 22. Moreover, alloy 24, that of greater mass, has a melting point higher than that of alloy 22. The differential between melting points may conveniently be chosen as about 25° F. For example, alloy 24 might have a melting point of 350° F. and alloy 22 a melting point of 325° F.

A geometry appropriate to a conventional gyroscope gimbal provides, for example, a mass balance adjustment to 100 mg.-cm. Alloy 24, acting alone, would then provide a balance of 100 ÷ 50 = 2 mg.-cm. The estimated resolution and repeatability may be postulated as being 0.1%; the finest adjustment obtainable with alloy 24 is then 0.1 mg.-cm. and with alloy 22 is 0.002 mg.-cm.

In practice, of course, heating the balance pan slightly above 350° F. causes both alloys to be melted. Then, the gyroscope is tilted in the proper direction and to a sufficient degree to permit the alloys to flow to the point at which balance is optimized. The gyroscope is then cooled to a temperature below 325° F. Balance is checked again, and if residual mass unbalance is found, the procedure is repeated. In the repetition, however, the instrument is raised to a temperature between 325° F. and 350° F., only alloy 22 melting in such circumstances. The gyroscope gimbal is thus balanced in a straightforward two-stage operation, trial and error being eliminated.

It is of course possible to utilize more than two thermally responsive materials of different melting points if that should be desired. Also, masses of alloys may be varied as required for differing applications and the configurations of the volumes may also be altered as required.

What is claimed is:

1. In an instrument having an element disposed for rotation about an axis, a system for changing the center of gravity of said element comprising a plurality of thermally responsive materials normally disposed in a solid state in a given fixed relationship to said element and influencing the center of gravity thereof, each of said materials having a different melting temperature, means for repetitively raising the temperature of said thermally responsive materials to render them molten and movable relative to said element, and means for selectively resolidifying said materials in an altered fixed relationship to said element whereby said center of gravity is changed.

2. In an instrument as defined in claim 1, the system for changing the center of gravity of said element wherein said plurality of thermally responsive materials comprises two such materials, one of relatively high melting temperature and one of relatively low melting temperature, and said means for raising the temperature of said materials comprises a heater and means for energizing said heater first to melt both of said materials and second to melt only said material of relatively low melting temperature.

3. In an instrument as defined in claim 2, the system wherein said material of relatively high melting temperature is of greater mass than said material of relatively low melting temperature.

4. In an instrument as defined in claim 1 the system wherein said element comprises a gimbal of a gyroscope, a balancing pan being fixed to said gimbal, said thermally responsive materials being disposed in predetermined areas of said balancing pan, and said means for melting said materials comprising a heater disposed in thermally conductive relationship to said balancing pan.

5. In an instrument as defined in claim 1, the system in which said plurality of thermally responsive materials comprises a first material of relatively great mass and relatively high melting temperature disposed substantially in an annular configuration and a second material of relatively low mass and relatively low melting temperature disposed substantially in a cylindrical configuration within said annular configuration.

6. In an instrument as defined in claim 5, the combination therewith of a balance pan for holding said thermally responsive materials, said balance pan having the surface thereof in contact with said thermally responsive materials coated with a substance to which said thermally responsive materials are adherent.

7. In an instrument as defined in claim 1, the system in which said plurality of thermally responsive materials comprises eutectic alloys having different melting temperatures.

8. A method of compensating for mass imbalance of the rotary element of a sealed instrument, said rotary element carrying a plurality of normally solid thermally responsive materials of differing melting temperatures and electrical means for heating said materials above their melting temperatures, the steps of actuating said electrical means to heat said thermally responsive materials to a temperature above that of the highest melting temperature of said plurality of materials, tilting said instrument to cause flow of all of said materials in a direction to compensate for imbalance of said rotary element, deactivating said electrical means until said thermally responsive materials resolidify, reactuating said electrical means to heat said thermally responsive materials above that of the second highest melting temperature of said plurality of materials, tilting said instrument to cause flow of all but the material of highest melting temperature in a direction to compensate for unbalance of said rotary element, deactuating said electrical means until all said materials again resolidify and repeating said steps to cause seriatim melting and resolidifying of materials of lower melting temperature than said material of second highest melting temperature.

9. In a method as defined in claim 8 wherein said plurality of thermally responsive materials comprises two materials of differing melting temperatures the process wherein said materials are melted and resolidified in their order of greater mass.

10. In a method as defined in claim 9 the process wherein the first thermally responsive material melted is annular in configuration and the second thermally responsive material melted is of cylindrical configuration disposed within said annular configuration.

* * * * *